Jan. 29, 1963 L. BERG 3,075,480
FROZEN CONFECTION DISPENSING MACHINE
Filed July 21, 1960 3 Sheets-Sheet 1

INVENTOR.
LOUIS BERG
BY Allen M Krass

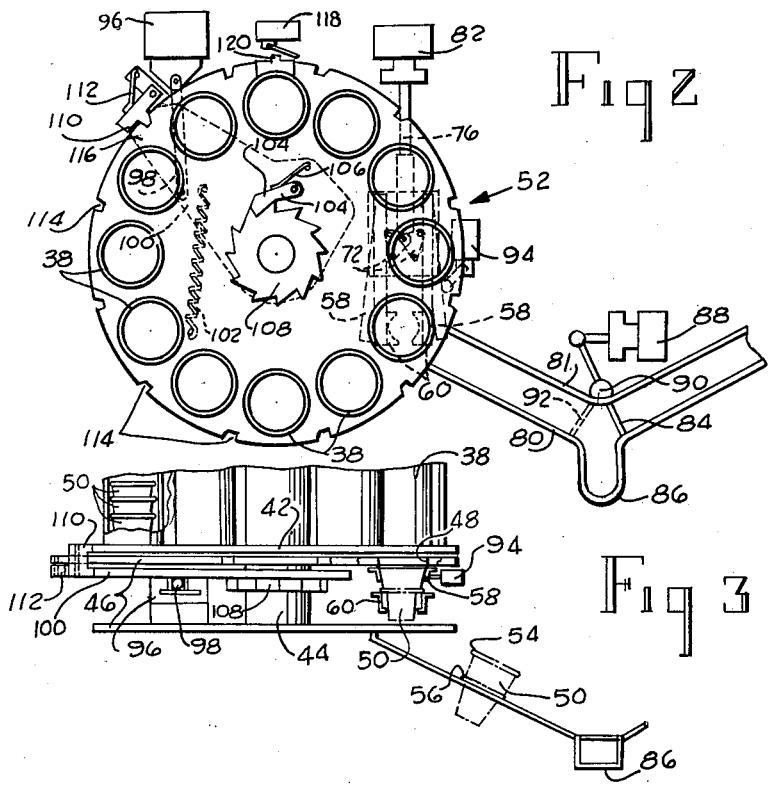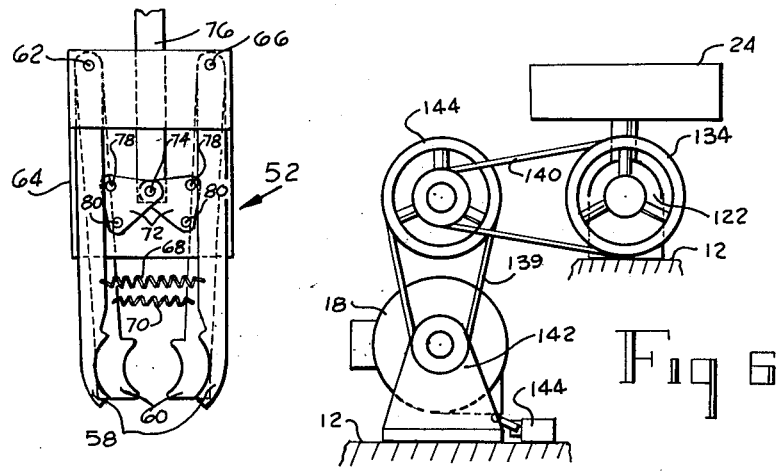

Jan. 29, 1963 L. BERG 3,075,480
FROZEN CONFECTION DISPENSING MACHINE
Filed July 21, 1960 3 Sheets-Sheet 3

INVENTOR.
LOUIS BERG
BY Allen M Kross

United States Patent Office 3,075,480
Patented Jan. 29, 1963

3,075,480
FROZEN CONFECTION DISPENSING MACHINE
Louis Berg, Troy, Mich., assignor to Duplic Industries, Detroit, Mich., a corporation of Michigan
Filed July 21, 1960, Ser. No. 44,321
10 Claims. (Cl. 107—1)

This invention relates to a coin-operated machine for dispensing a chilled confection, commonly termed soft ice cream, in a baked "cone" container. Coin-operated dispensers for a wide variety of foods and beverages are well known. A machine for dispensing soft ice cream in baked cones, however, presents several unique problems. One of these is the method of storing and dispensing a large number of cones which are bulky so as to require relatively large storage volume and are extremely fragile. Another problem is how to accurately dispense a uniform volume of the soft ice cream to the cone. The third problem resides in a method of maintaining the soft ice cream at the proper consistency without excessive consumption of power or deterioration of the product. These problems are intimately related as they must be solved within the confines of a limited volume and in a compatible manner.

The present invention contemplates a machine which is capable of storing a large number of cones and of dispensing a uniform volume of soft ice cream of uniform viscosity and consistency into the cones over a long period of time. The contemplated machine is also simple in construction and control so as to be economical to manufacture and reliable in operation.

In a preferred embodiment of the machine, to be described in detail subsequently, the cones are stacked in a plurality of vertical columns arranged about the perimeters of two turntables. One circumferential position about each of the turntables serves as a dispensing position and the various columns of cones are successively indexed into that position by rotation of their turntables. The cones from one turntable are utilized and then the second turntable is powered and its cones are utilized.

The cones may be dropped from the dispensing position one at a time through use of a unique gripping mechanism which drops the selected cone onto a slide that carries it into a position under the dispensing head of a freezer unit. When a sufficient time has elapsed from the initial actuation of the mechanism to allow the cone to be in the dispensing position, a valve in the dispensing head is actuated for a predetermined length of time. A control circuit is provided which maintains the soft ice cream in the freezer at a predetermined viscosity. Therefore, volumes of soft ice cream dispensed through opening the valve for a predetermined time are equal.

The control circuit operates in connection with means for stirring soft ice cream so as to increase its viscosity. A torque sensitive switch on the stirring mechanism acts to terminate the stirring motion which is initiated at regular intervals when the machine is not in use and at any time a coin is inserted in the machine.

It is, therefore, an object of the present invention to provide a coin-operated machine for maintaining and dispensing soft ice cream into cones.

Another object is to provide such a machine which will store and service a large number of cones in succession.

A further object is to provide such a machine which will dispense a uniform volume of soft ice cream into each cone.

Other objects, advantages and applications of the present invention will be made apparent by a following detailed description of a preferred embodiment of the invention. The description makes reference to the accompanying drawings in which:

FIGURE 2 is a sectional view taken along lines 2—2 of FIGURE 1 and illustrates the cone indexing and dispensing mechanism;

FIGURE 3 is an elevation view of the mechanism of FIGURE 2;

FIGURE 4 is a detailed view of the cone dispensing mechanism;

FIGURE 6 illustrates the driving mechanism for the stirring mechanism of FIGURE 5.

Figure 1:
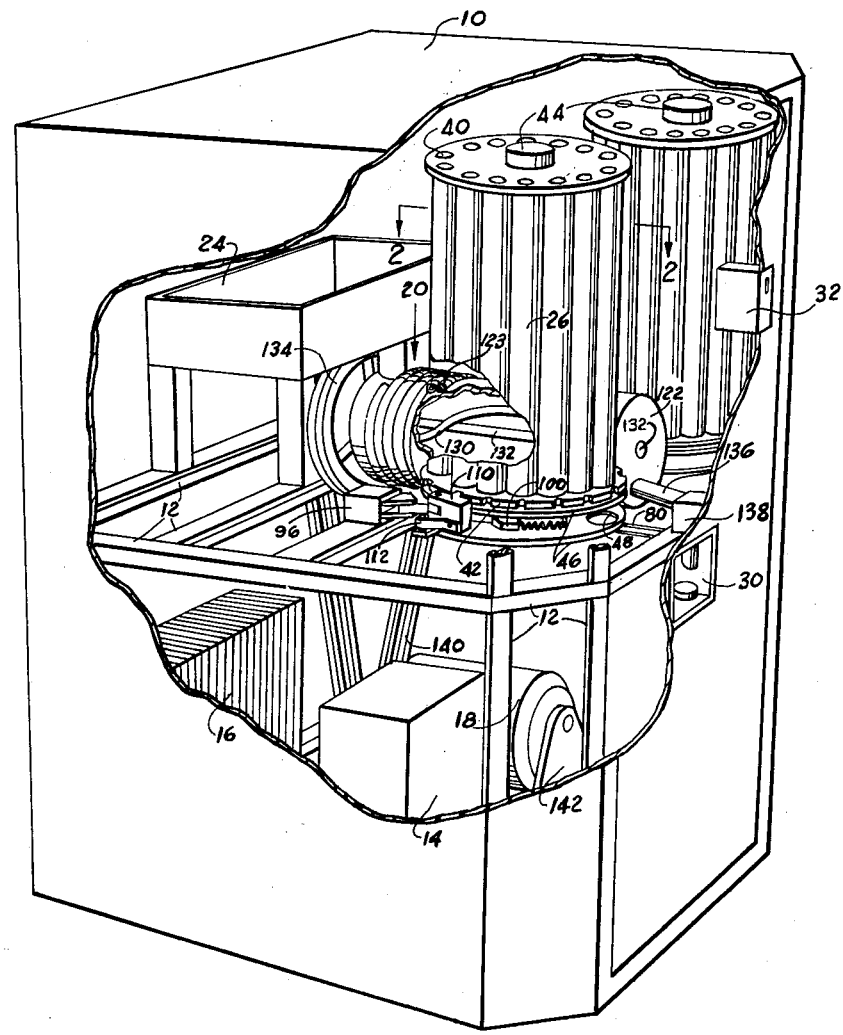
FIGURE 1 represents a perspective view of the outside of the machine cut away at particular points to show the relationship of the major components.

The preferred embodiment of the machine is disposed within a panelled case 10; it is supported on an enclosing framework formed of angle iron 12. The bottom of the case contains a refrigerating mechanism including a hermetically sealed compressor unit 14 and a condenser 16. An electric motor 18 which drives the soft ice cream stirring mechanism is disposed adjacent to the compressor 14 and is connected to the freezer mechanism generally indicated at 20 by belting 138 and 140. The freezer mechanism is maintained in a full condition by a storage pan 24 in a manner which will be subsequently described.

The cones are maintained in a plurality of vertical stacks circled about two sections generally indicated at 26. The cones are dropped onto a track 80, 81 hereinafter described which carries them to a dispensing position 30 where they are directly under the outlet of the freezer 20. The entire operation is initiated by a coin-accepting mechanism of any well known type generally indicated at 32.

The cone storing and injecting mechanism generally indicated at 26 is illustrated in detail in FIGURES 2 and 3 and will first be described.

The cone dispenser comprises two identical sections 26 which are arranged symmetrically about the center of the machine; therefore, FIGURES 2 and 3 illustrate only one of the sections. Each section comprises 12 vertically aligned stainless steel tubes 38 which are supported at their upper ends by a first carrier plate 40 and at their lower ends by a second carrier plate 42. The plates 40 and 42 both include circles of apertures which expose the ends of the tubes 38. The plates 40 and 42 are supported on ball bearings about a central column 44 that is fixed with respect to frame 12 of the machine. The tubes 38 may, therefore, be rotated with respect to the central column 44.

A pair of spaced stationary plates 46 are supported directly below the plate 42 and are fixed about the central column 44. The plates 46 have apertures 48 which line up with the lower ends of the tubes 38 as they are rotated into position with respect to it. The top of the casing 10 is removable and allows stacks of cones 50 to be placed within the tubes 38. The lower surface of each cone stack is supported by the upper section of plate 46 which prevents its passage except when it is in alignment with the apertures 48.

The mechanism for dropping a single cone at a time from the tubes 38, generally indicated at 52, takes advantage of the fact that the cones have an upper lip 54 and a lower lip 56. The dropping mechanism comprises an upper clamp set consisting of a pair of identical arms 58 and a lower clamp set consisting of a pair of identical arms 60. One upper arm 58 and one lower arm 60 are pivotably supported about a first pin 62 fixed to the block 64 while the other pair of arms 58 and 60 are pivotably supported by the second pin 66 in the same block 64. The block 64 is supported on the underside of the stationary circular plate 46 adjacent to the aperture 48.

The upper arms 58 are biased toward one another by a spring 68 which connects to both of them while the lower arms 60 are biased toward one another by a similar spring 70. The positions of the arms 58 and 60 are controlled by a pair of triangular cam plates 72 both pivotably hinged about a pin 74 on the end of a solenoid rod 76. The cam plates 72 bear against the upper arms 58 by means of a pair of pins 78 which are disposed in one corner of the triangle. Similarly, they bear against the lower arms 60 with a second pair of pins 80. The rod 76 is attached to an electrically actuated solenoid 82. In FIGURE 4, the arms are shown in their normal position with the rod in a retracted position. When in this position, one cone is supported on its lower lip 56 by the arms 60.

When the cycle is initiated by dropping a coin in the box 32, a solenoid 82 which is supported on the frame 12 is actuated to extend its rod 76. This causes the pin 74 to move forward and change the points at which the pins 78 and 80 bear against the arms 60 and 58, respectively. The action is such as to cause the pins 78 to move toward one another and cause the pins 80 to move apart. This allows the arms 58 to close toward one another grasping the cone immediately above the lowermost cone 50 by its upper edge 54. Then the lower arms 60 separate and allow the lowest cone in the stack to drop. Next, the solenoid 82 retracts its rod 76 and allows the lower arms 60 to grasp the now lowest cone by its lower lip 56 while the upper arms 58 open. This action is such as to insure that only one cone is dispensed at a single time from the rack.

The cone that falls from the arm 60 drops onto an inclined runway that supports the cone on its lower lip 56 by two wires 80 and 81. Gravity causes the cone to slide down the runway to a point where the outer gate wire 80 makes a convex turn and the inner wire 81 makes a concave turn. At that point, the lip falls off the inner wire 81 and is caught on a downwardly directed gate wire 84 which drops it into a dispensing position where it is caught by wire 86.

The gate 84 is controlled by a solenoid 88 which swings it about a pivot point 90. It may thereby swing into the position shown in the phantom at 92 when the cones in the storage section 34 are exhausted to utilize the cones in the section 36.

When the arms 58 close about a cone so as to grasp it by its upper lip 54, a limit switch 94 detects the presence of a cone. If the cone is absent, the arms 58 will close further than usual. In that event, the switch 94 will cause a solenoid 96 to be actuated so as to cause the support plate 42 to index bringing the next full stack over the aperture 48.

A link 98 is pivotably connected to the arm of the solenoid 96. This link in turn connects to a plate 100 which is pivotably supported about the central column 44. A spring 102, which has one end fixed to the plate 46 and the other end fixed to plate 100, thereby biases the radially outward end of the plate 100 away from the solenoid 96. A pawl 104 is pivotably supported on the plate 100 and is biased toward the center column 44 by a spring 106. The pawl 104 normally rests in one of the steps of a ratchet 108 which is fixed to the lower support plate 42 of the tubes 38 and which is rotatable with that plate about the central column 44.

When the solenoid 96 retracts its arm, it moves the plate 100 in a clockwise direction as viewed in FIGURE 2 and thereby moves the pawl 104 into the next ratchet position. When the solenoid 96 releases its arm, the spring 102 moves the plate in the counterclockwise direction and causes the pawl to rotate the ratchet 108 on its attached plate 42 thereby indexing the next tube of cones 38 into position over the aperture 48.

The plate 42 is locked in the proper position by a shot-pin member 110 which is biased by a spring 112 into locking position in one of the plurality of notches 114 which are disposed at regular intervals about the perimeter of the plate 42 and are so positioned that when the shot-pin member 110 is locked in one of the notches a particular tube 38 is aligned with the aperture 48. When the solenoid 96 retracts the plate 100 so as to prepare for an index, a cam member 116 on the plate 100 pulls the shot-pin member 110 out of locking relationship with the plate 42.

Another limit switch 118 is positioned adjacent to the perimeter of the rotatable plate 42 and is actuated once in each full revolution of plate 42 by protuberance 120 on the perimeter of the plate. The actuation of this switch indicates that the plate 42 has made one complete rotation and, therefore, all the tubes 38 have been emptied. The device at this point throws a switch which powers the other support plate 42 which turns the stack of tubes illustrated at the right in FIGURE 1. The same switching action reverses the gate 84. A switch on the right-hand stack of tubes 38 which is the equivalent of switch 118 turns the entire unit off when it is actuated as such a condition indicates that all the stacks of cones are exhausted.

*Soft Ice Cream Dispensing Mechanism*

The apparatus for freezing and maintaining the soft ice cream in a proper viscous condition for dispensing it into a cone disposed in the ring 86 will now be considered.

Figure 5:
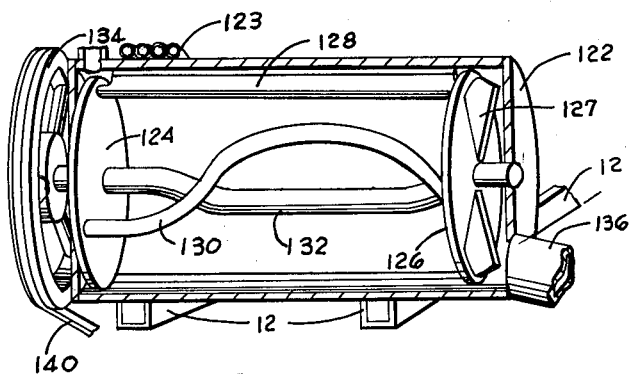
FIGURE 5 is a perspective view of the mechanism for stirring the soft ice cream in its freezer.

The freezing compartment generally indicated at 20 consists of a horizontally aligned cylindrical member 122 which is supported on the steel frame 12 and which contains a beating mechanism, termed a dasher, which is shown in detail in FIGURE 5. The dasher comprises a cylindrical rear plate 124, and a forward plate 126 which are connected by a straight wiping blade 128, a spiral whipping blade 130, and an offset whipping blade 132. The offset whipping blade 132 extends as a central shaft beyond the rear of the back plate 124 and connects to a pulley 134. The pulley 134 is rotated by the electric motor 18 which connects to it through a drive comprising a pair of V-belts 139 and 140 and a reduction pulley 144.

The rotation of the pulley 134 acts to rotate the blades 128, 130 and 132 within the cylindrical container. The blades 130 and 132 agitate and whip the soft ice cream preparation in the container while the blade 128 wipes the material from the sides of the container. The container 122 is wrapped with freezing coils 123 connected to the compressor 14 and the condenser 16.

The forward plate 126 of the dasher has forward and rear projections 127 which act as a screw as the dasher is rotated to feed the frozen ice cream forward to a dispensing nozzle 136. The valve 138 connects to the nozzle 136 and provides output to the dispensing area immediately above the cone support wire 86.

The container 122 is continually maintained filled by means of an inlet 140 which is connected to its top surface at its rear and is filled from the pan 24 by gravity feed. The material in the pan 24 feeds into the cylinder 122 in a liquid condition and it is frozen in cylinder 122 into a viscous flowing mass.

The nature of the cylinder 122 and the dasher and feeding container 124 are well known to the art as are the compositions of material used in them. Their novelty in the present invention lies only in their manner of cooperation with the other elements.

The motor 18 which drives the dasher through the belt system finds support in a set of trunnion mounts 142 in such a manner that the motor may pivot about its axis once a force in excess of the friction force at its trunnion mounts is exerted. Since the load imposed on the motor by the whipping blades 130 and 132 causes a reaction force on the trunnion mounts 142, the motor will pivot when the viscosity of the soft ice cream material reaches a certain level. This pivoting actuates a limit switch 144 and turns off the motor 118. In this manner the soft ice cream material is maintained at a relatively constant viscosity.

The soft ice cream material is of such composition that its agitation by the dasher blades and its change in temperature by being brought in proximity to the freezer coils causes it to increase in viscosity. This increase in viscosity causes a resultant increase in the torque required of the driving motor 136 to a point where the motor rotates about its mount 142 and actuates the limit switch 144. The motor is started at regular intervals and whenever a coin is inserted into the machine and continues to operate until limit switch 144 is actuated. This technique maintains the soft ice cream in the cylinder 122 at a proper state of viscosity.

Controls

Figure 7:
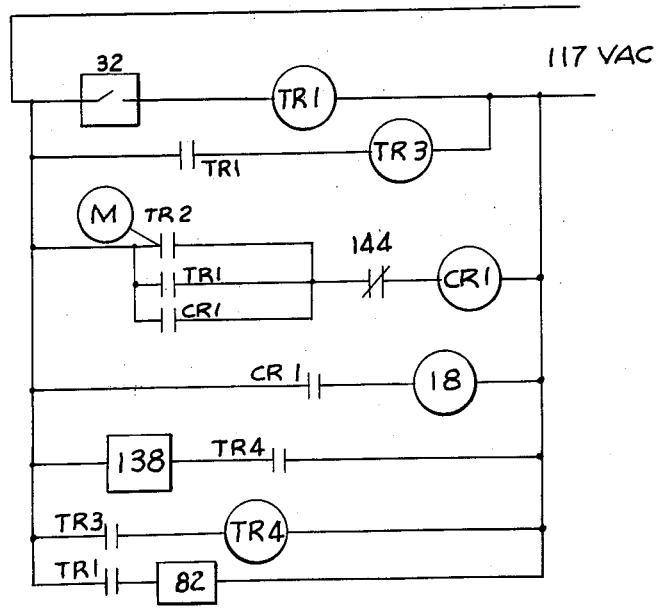
FIGURE 7 is a simplified schematic electrical representation of portions of the control circuit of the machine.

FIGURE 7 illustrates the more important controls of the machine in a simplified schematic form. The cycle of operation is initiated when the coin mechanism 32 is actuated by the receiving of an acceptable coin. A momentary contact switch in the box 32 provides power from a standard 117 volt alternating current source to the coil of a first timing relay TR–1. This relay's normally open contacts lock in its coil until it times out after an interval which is predetermined to be adequate for the release of the cone and the dispensing of the soft ice cream into the cone. Normally open contacts of TR–1 also actuate a second timing relay TR–3 which performs the function of opening the dispensing valve 138 after a time interval calculated to be sufficient to drop a cone into the dispensing position. This is done by a pair of normally open contacts of the relay TR–3 which actuate another timing relay TR–4. The normally open contacts of TR–4 are in series with the solenoid valve 138 which controls the dispenser. This timing relay TR–4 closes for a predetermined length of time.

The dasher motor 18 is actuated by normally open contacts of the relay CR–1 which are in series with it. The coil of the relay CR–1 is in series with the normally closed limit switch 144 and a parallel combination of its own normally open contacts, the normally open contacts of the main timing relay TR–1 and normally open contacts of a motor driven timer TR–2. The motor driven timer TR–2 is designed to close momentarily at regular intervals of time, preferably approximately 10 minutes. When it does so, the relay CR–1 is closed through the normally closed contacts of the limit switch 144 and the dasher motor 18 is started. It remains in operation until the contacts of limit switch 144 open. Similarly, when the machine cycle is initiated by a coin, the contacts of TR–1 close and start the motor 18 until the consistency of the soft ice cream is such that the limit switch 144 is open.

This combination of maintaining the soft ice cream at a predetermined consistency and viscosity through frequent actuation of a torque controlled motor, in combination with the actuation of the freezer output valve 138 for a predetermined length of time has been found to result in the dispensation of a constant volume of soft ice cream into the cone.

Since the dasher is rotated to a constant velocity by the motor 18, its front feeding plate 126 feeds out a constant flow for a given consistency of the material.

Having thus described my invention, I claim:

1. A soft ice cream dispensing machine comprising in combination: a cone dispenser adapted to support a plurality of vertical stacks of cones; a gravity-feed device for removing a single cone from the lowest position in one of said stacks and for translating it to a dispensing position; means for actuating said dispenser for sequentially moving said plurality of stacks into position with respect to said gravity feed device upon the utilization by such device of all the cones in the sequentially previous stack; a refrigerating device for a soft ice cream material including a rotary whipping member operative to increase the viscosity of the refrigerated soft ice cream material upon its rotation; a motor driving said whipping device; a first control system for said motor including a viscosity measuring device, such system being operative to maintain the viscosity of said material at a predetermined value; a valve operative above said dispensing position for conveying said material from said refrigerating area into said cone; a coin receiving box operative to provide an electrical signal upon receipt of certain coins; and a control circuit operative to open said valve for a predetermined period of time upon receipt of a signal from said coin receiving box.

2. A soft ice cream dispensing machine comprising in combination: a cone dispenser adapted to support a plurality of vertical stacks of cones; means for removing a single cone from the lowest position from one of said stacks and for translating it to a dispensing position; means for actuating said dispenser for sequentially moving said plurality of stacks into position with respect to said gravity feed device upon utilization by such device of all the cones in the sequentially previous stack; a refrigerating device for a soft ice cream material including a rotary whipping member operative to increase the viscosity of the refrigerated soft ice cream material upon its rotation; a motor driving said whipping device; a first control system for said motor including a viscosity measuring device, such system being operative to maintain the viscosity of said medium at a predetermined value; a valve operative above said dispensing position for conveying said material from said refrigerating area into said cone; a coin receiving box operative to provide a signal upon its receipt of particular coins; and a control circuit operative to open said valve for a predetermined period of time upon receipt of a signal from said coin receiving box.

3. A soft ice cream dispensing machine comprising in combination: a cone dispenser adapted to support a plurality of vertical stacks of cones arranged in a circular pattern about a vertical central axis and arranged for rotation about that axis; a gravity feed device for removing a single cone from the lowest position from one of said stacks and for translating it to a dispensing position, means for actuating said dispenser for sequentially indexing said stacks into position with respect to said gravity feed device upon the utilization by such device of all the cones in the sequentially previous stack; a refrigerating device for a soft ice cream material including a rotary whipping member operative to increase the viscosity of the refrigerated soft ice cream material upon its rotation; a motor driving said whipping device; a first control system for said motor including a viscosity measuring device, such system being operative to maintain the viscosity of said material at a predetermined value; a valve operative above said dispensing position for conveying said material from said refrigerating area into said cone; a coin receiving box operative to provide a signal upon its receipt of particular coins; and a control circuit operative to open said valve for a predetermined period of time upon receipt of a signal from said coin receiving box.

4. A soft ice cream dispensing machine comprising in combination: a cone dispenser adapted to support a plurality of vertical tubes arranged in a circular pattern about a vertical axis; means for rotating said tubes about said axis; a horizontal plate disposed beneath said tubes and having a single aperture in alignment with the circular path followed by said tubes in their rotation; means disposed in alignment with said aperture for receiving the lowest cone in a stack of cones in one of said tubes and for translating it to a dispensing position; means for actuating said dispenser for sequentially indexing said tubes into position with respect to said device upon the utilization by such device of all the cones in the sequentially previous stack; a refrigerating device for a soft ice cream material including a rotary whipping member operative to increase the viscosity of the refrigerated soft ice cream material upon its rotation; a motor driving said whipping member; a first control system for said motor including a viscosity measuring device, such system being operative to maintain the viscosity of said material at a predetermined value; a valve operative above said dispensing position for conveying said medium from said refrigerating area into said cone; a coin receiving box operative to provide a signal upon its receipt of particular coins; and a control circuit operative to open said valve for a predetermined period of time upon receipt of a signal from said coin receiving box.

5. A soft ice cream dispensing machine comprising in combination: a cone dispenser adapted to support a plurality of vertical stacks of cones; two pairs of feed fingers operative to engage the lowest two cones in one of said stacks in a sequential manner so as to separate the lowest cone in said stack from said stack and to otherwise support said stack; gravity feed means for receiving a cone from said finger pairs for translating it to a dispensing position; means for actuating said dispenser for sequentially moving said plurality of stacks into position with respect to said cone removing device upon the utilization by such device of all the cones in the sequentially previous stack; a refrigerating device for a soft ice cream material including a rotary whipping member operative to increase the viscosity of the refrigerated soft ice cream material upon its rotation; a motor driving said whipping device; a first control system for said motor including a viscosity measuring device, such system being operative to maintain the viscosity of said material at a predetermined value; a valve operative above said dispensing position for conveying said material from said refrigerating area into said cone; a coin receiving box operative to provide a signal upon its receipt of certain coins; and a control circuit operative to open said valve for a predetermined period of time upon receipt of a signal from said coin receiving box.

6. A soft ice cream dispensing machine comprising in combination: a cone dispenser adapted to support a plurality of vertical stacks of cones; a horizontal plate supporting said vertical stacks at their lower ends; a single aperture in said plate in alignment with one of said stacks; a feeding device in alignment with said aperture operative to contact the lowest two cones in a particular stack in position with respect to said aperture and to remove the lowest cone from said stack while supporting said stack in its vertical position; gravity feed means for receiving the lowest cone so selected and for translating it to a dispensing position; means for actuating said dispenser for sequentially moving said plurality of stacks with respect to said feeding device upon the utilization by such device of all the cones in the sequentially previous stack; a refrigerating device for a soft ice cream material including a rotary whipping member operative to increase the viscosity of the refrigerated soft ice cream material upon its rotation; a motor driving said whipping device; a first control system for said motor including a viscosity measuring device, such system being operative to maintain the viscosity of said material at a predetermined value; a valve operative above said dispensing position for conveying said material from said refrigerating area into said cone; a coin receiving box operative to provide a signal upon receipt of particular coins; and a control circuit operative to open said valve for a predetermined period of time upon receipt of a signal from said coin receiving box.

7. A soft ice cream dispensing machine comprising in combination: a cone dispenser adapted to support a plurality of vertical stacks of cones; a horizontal plate disposed beneath said stacks operative to support said stacks by means of its contact with the lowest cone in said stack; an aperture in said plate in alignment with one of said stacks; a feeding device disposed within said aperture and operative to support the stack disposed in alignment with said aperture and to remove the lowest cone from said stack at an appropriate point in the operation of the machine, such device comprising a first pair of fingers operative to swing toward and away from one another in a horizontal plane, a second pair of fingers operative to swing toward and away from one another in a horizontal plane disposed immediately below said first pair of fingers, such pairs of fingers being operative to engage said cones when closed and to disengage said cones when open; means for engaging said finger pairs in such sequences to grip the lowest cone in said stack, then grip the second lowest cone in said stack, then release the grip on the lowest cone in said stack; means for actuating said dispenser for sequentially moving said plurality of stacks into position with respect to said aperture upon the utilization by said feed device of all the cones in the sequentially previous stack; an inclined track for receiving said lowest cone from said feed device and for translating it to a dispensing position; a refrigerating device for a soft ice cream material including a rotary whipping member operative to increase the viscosity of the refrigerated soft ice cream material upon its rotation; a motor driving said whipping device; a first control system for said motor including a viscosity measuring device, such system being operative to maintain the viscosity of said material at a predetermined value; a valve operative above said dispensing position for conveying said material from said refrigerating area into said cone; a coin receiving box operative to provide a signal upon its receipt of certain coins; and a control circuit operative to open said valve for a predetermined period of time upon receipt of a signal from said coin receiving box.

8. A soft ice cream dispensing machine comprising in combination: a cone dispenser adapted to support a plurality of vertical stacks of cones; a gravity-feed device for selecting a single cone from the lowest position in one of said stacks and for translating it to a dispensing position; means for actuating said dispenser for sequentially moving said plurality of stacks into position with respect to said gravity feed device upon the utilization by such device of all the cones in the sequentially previous stack; a refrigerating device for a soft ice cream material including a rotary whipping member operative to increase the viscosity of the refrigerated soft ice cream medium upon its rotation; a motor driving said whipping device; a control system for said motor operative to maintain the viscosity of said material at a predetermined value, said system including means for initiating the motor at regular intervals, means for initiating the motor at such time as the system is operative to dispense said material, and means for measuring the viscosity of the material and for deactivating the motor when the viscosity reaches a predetermined value; a valve operative above said dispensing position for conveying said material from said refrigerating area into said cone; a coin receiving box; and a control circuit operative to open said valve for a predetermined period of time upon receipt of a signal from said coin receiving box operative to provide a signal upon its receipt of certain coins.

9. A soft ice cream dispensing machine comprising in combination: a cone dispenser adapted to support a plurality of vertical stacks of cones; a gravity-feed device for selecting a single cone from the lowest position in one of said stacks and for translating it to a dispensing position; means for actuating said dispenser for sequentially moving said plurality of stacks into position with respect to said gravity feed device upon the utilization by such device of all the cones in the sequentially previous stack; a refrigerating device for a soft ice cream material including a rotary whipping member operative to increase the viscosity of the refrigerated soft ice cream material upon its rotation; a motor driving said whipping device; a control system for said motor including means for initiating said motor at regular intervals, a torque measuring device measuring the reaction of said medium to said whipping device, means for deactivating said motor when such torque reaches a predetermined value; a valve operative above said dispensing position for conveying said material from said refrigerating area into said cone; a coin receiving box operative to provide a signal upon its receipt of certain coins; and a control circuit operative to open said valve for a predetermined period of time upon receipt of a signal from said coin receiving box.

10. A soft ice cream dispensing machine comprising in combination: a cone dispenser adapted to support a plurality of cones; means for actuating said dispenser to select a single one of said cones to remove it to a dispensing position; a refrigerating device for a soft ice cream material including a rotary whipping member operative to increase the viscosity of the material upon its rotation; a motor driving said whipping device; a control system for said motor including means for initiating said motor at regular intervals; a torque measuring device measuring the reaction of said medium to said whipping device; means for deactivating said motor when said torque reaches a predetermined value; a valve operative above said dispensing position for conveying said medium from said refrigerating area into said cone; a coin receiving box operative to provide a signal upon its receipt of particular coins; and a control circuit operative to open said valve at a predetermined time upon receipt of a signal from said coin receiving box.

References Cited in the file of this patent

UNITED STATES PATENTS

| | | |
|---|---|---|
| 1,700,873 | Augustin et al. | Feb. 5, 1929 |
| 2,385,267 | Franz | Sept. 18, 1945 |
| 2,508,435 | Tacchella | May 23, 1950 |
| 2,522,648 | Tacchella | Sept. 19, 1950 |
| 2,728,306 | Tarr | Dec. 27, 1955 |